United States Patent

Aidlin et al.

[15] 3,704,780

[45] Dec. 5, 1972

[54] SEPARATOR-CONVEYOR

[72] Inventors: Samuel S. Aidlin, 214 Beaumont St.;
Stephen H. Aidlin, 3855 Shore Parkway, both of New York, N.Y. 11235

[22] Filed: June 24, 1971

[21] Appl. No.: 156,249

[52] U.S. Cl. .......................209/73, 209/99, 198/131
[51] Int. Cl. ................................................B07c 5/06
[58] Field of Search ...209/99, 100, 73; 198/131, 172

[56] References Cited

UNITED STATES PATENTS

| | | | |
|---|---|---|---|
| 932,749 | 8/1909 | Barnett | 209/99 |
| 2,295,190 | 9/1942 | Zenge et al. | 209/99 |
| 3,301,397 | 1/1967 | Stutz | 209/99 X |
| 3,211,289 | 10/1965 | Brumagin | 209/99 |

*Primary Examiner*—Allen N. Knowles
*Attorney*—Victor M. Helfand

[57] ABSTRACT

A separator-conveyor for the product and scrap of blow-molding apparatus in which the product drops between spaced, upwardly and outwardly convergent guide plates onto the top of closely spaced flat, rigid cleats arranged in edge-to-edge relation longitudinally of an endless conveyor belt. The cleats have their top edges terminate short of the convergent edges of the guide plates and the blow molding products rest on top of the cleats and against the edges of the guide plates, the scrap dropping between the guide plates to each side of the cleats. In one embodiment of the invention spaced, selected of the cleats are of higher altitude and extend into the space between the guide plates to act as pushers for the blow molded products.

11 Claims, 8 Drawing Figures

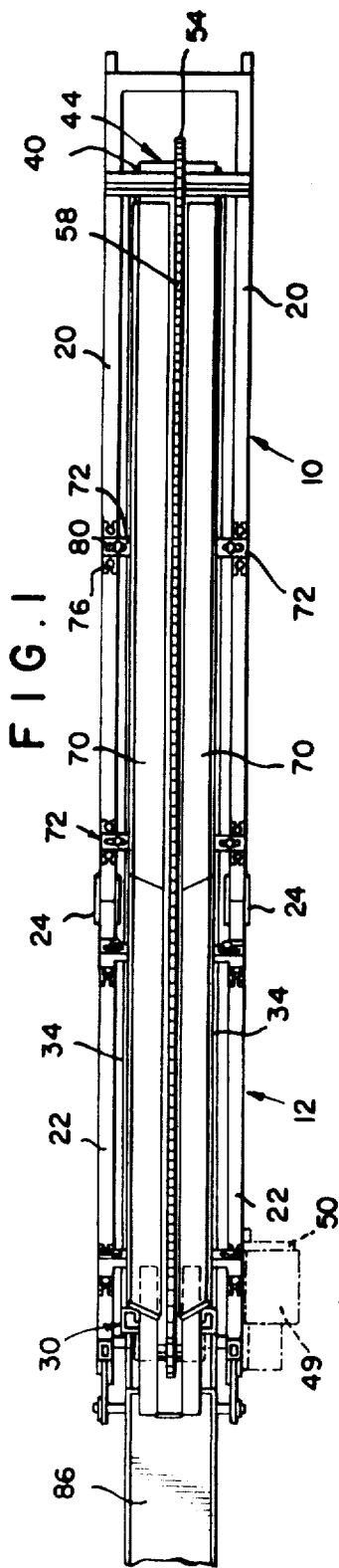
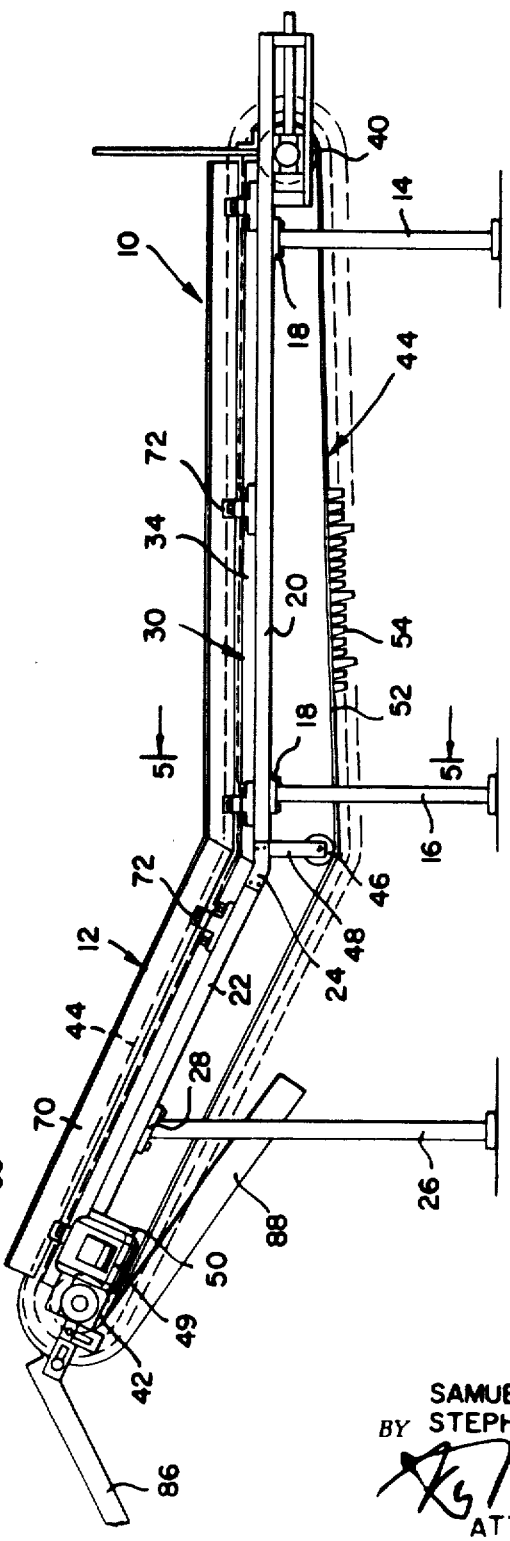

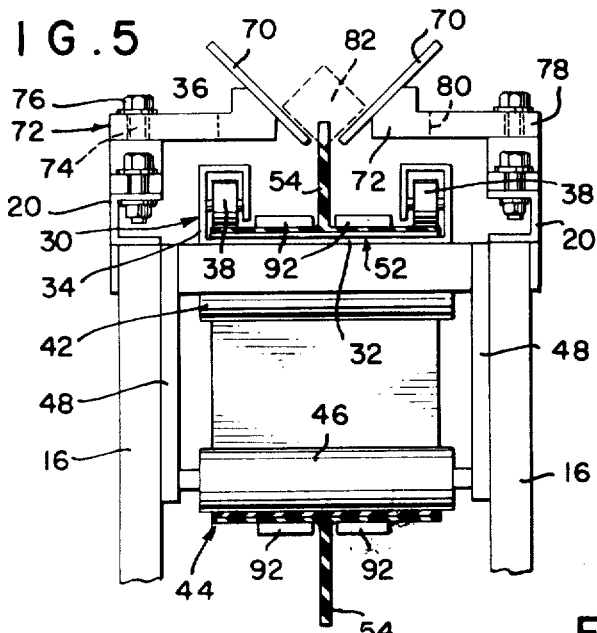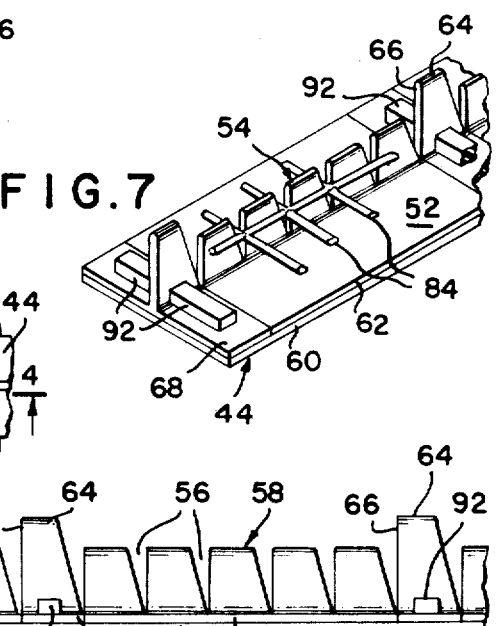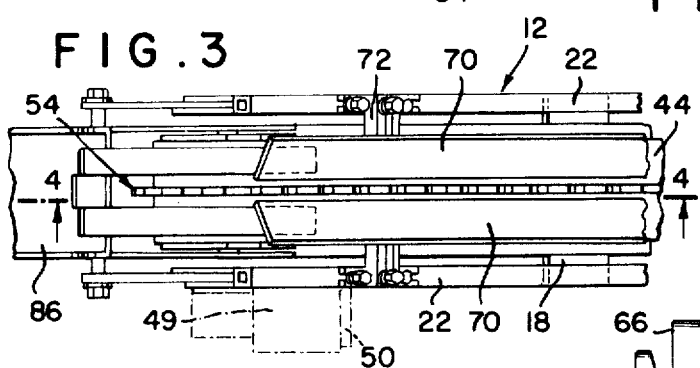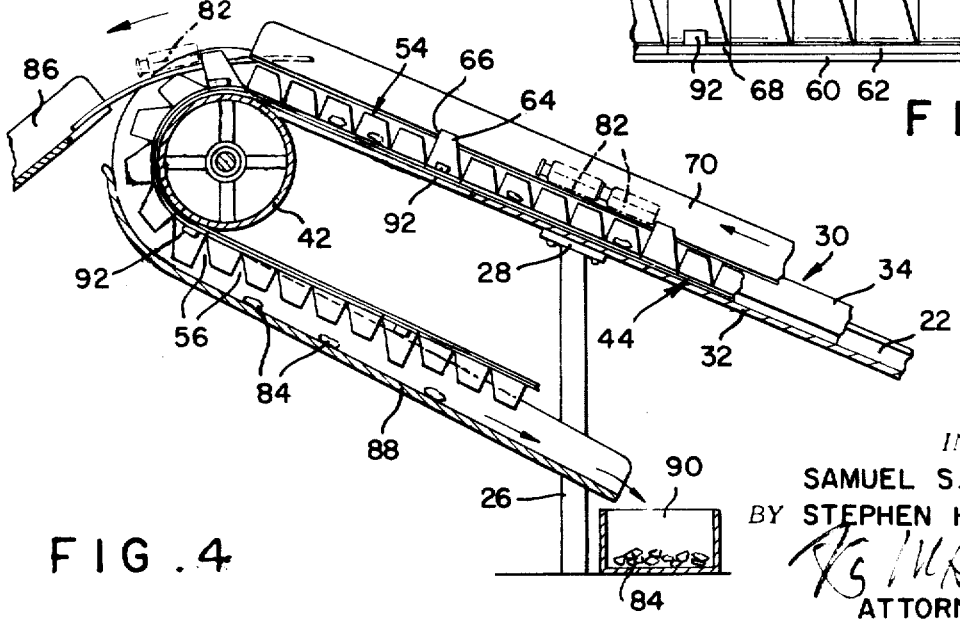
INVENTORS,
SAMUEL S. AIDLIN
BY STEPHEN H. AIDLIN
ATTORNEY

SEPARATOR-CONVEYOR

The present invention relates to an auxilliary apparatus particularly adapted for use with blow-molding apparatus for forming thermoplastic bottles, or like containers, and is directed to the provision of such auxilliary apparatus that will receive from the molding apparatus the molded articles together with the associated scrap material deriving from the trimming of such articles of all excess plastic material, and that convey both the article and the scrap to separate destinations.

In forming thermoplastic bottles, or like containers by blow-molding, a heated and softened parison tube of thermoplastic material is caught between two or more sections of a mold and then air is blown into the soft plastic parison tube to shape it in the form of the mold cavity. In such procedure, the bottom end of the parison tube is caught between the mold sections in order to seal the bottom of the parison tube and form the bottom of the bottle; the portion of the tube so caught constituting a "tail" which is generally broken away from the bottle as it is discharged from the molding apparatus.

The present invention is directed to the provision of a separator-conveyor that will receive and separately convey the molded bottle and its broken away "tail" and other trim, if present, to separate destinations; the former to a destination such as a bin, the latter to a conveyor that will, for example, return it to a grinding machine to be ground for re-use.

The present invention is an improvement over the invention described and claimed in my co-pending application, Ser. No. 17,665 filed Mar. 9, 1970; such improvement residing in making the apparatus especially useful in the procedure of blow-molding of bottles or like containers.

In my co-pending application, I have described and claimed an apparatus whose endless conveyor belt is formed with spaced transverse cleats on the tops of which is supported either the molded article or its scrap, whichever is larger, while the companion product, the scrap or the article, drops between the cleats; the two being fed into different outlets of the apparatus.

It has been found that in the apparatus of my said co-pending application, the article supporting cleats of the endless conveyor belt tend to separate from the belts after a period of use. It has also been found that, when such apparatus includes an upwardly sloping section, there is no means for positively engaging all of the articles supported on the cleats in their upward movement on the slope of the apparatus.

The present invention, therefore, contemplates the provision of apparatus in which the conveyor belt moving the articles and the scrap, is formed in a manner that will render it durable for longer periods of time.

It is also an object of the present invention to provide apparatus of the character described having means for positively engaging the conveyed bottles or like containers, as well as the scrap material for positively moving the same upwardly along the sloping section of the apparatus.

Freshly-blown blow molded bottles or like articles have a high temperature, and are, therefore, soft and subject to have their surface portions of the conveying apparatus. It is, therefore, another object of the present invention to provide apparatus of the character described in which the conveyed product is brought into contact with a minimum of apparatus surface, to thereby avoid the marring of the product surface as well as exposing greater areas of the surface to the air, for more rapid cooling.

It is a further object of the present invention to Provide apparatus of the character described which may be adjusted to convey bottles or like articles of varying cross-sections in which the article contacting areas of the apparatus are constant, regardless of the cross-section of the article being moved.

The foregoing and other objects and advantages of the separator-conveyor of the present invention will become more readily apparent to those skilled in the art from the embodiment thereof shown in the accompanying drawing and from the description following. It is to be understood, however, that such embodiment is shown by way of illustration only, to make the principles and practice of the invention more readily comprehensible, and without intent of limiting the invention to the specific details therein shown. In the drawings:

FIG. 1 is a top plan view of one embodiment of the apparatus of the present invention;

FIG. 2 is a side elevational view of the same;

FIG. 3 is a fragmentary top plan view, on an enlarged scale, of the outlet end of the apparatus;

FIG. 4 is a side elevational, partly sectional view of the outlet end of the apparatus shown in FIG. 3;

FIG. 5 is a section, on an enlarged scale, taken on line 5—5 of FIG. 3;

FIG. 6 is a fragmentary, enlarged, side elevational view of the apparatus showing details of the mounting of the guide plates thereof;

FIG. 7 is a fragmentary, perspective view of the conveyor belt of the apparatus; and FIG. 8 is a fragmentary, side elevational view of the belt.

Generally stated, the present invention resides in the provision of improved article conveying means for the apparatus, formed of an improved endless conveyor belt having upstanding longitudinally arranged cleats disposed thereon extending upwardly to a point below the opening between the spaced longitudinally extending upwardly diverging article supporting and guiding plates; with selected spaced of the cleats extending into the space between the guide plates, to serve as pushers for the positive movement of the fed articles.

Transverse cleats are also provided on the belt to each side of the longitudinally arranged cleats for positively moving the scrap material. In the preferred embodiments the guide plates are adjustably mounted to enable the varying of the space between their lower edges for the accomodation of article of different thicknesses and to permit such articles to rest on the tops of the cleats as well as against the edges of the guide plates.

More specifically, the separator-conveyor apparatus of the invention is shown to comprise a frame including a horizontally disposed frame section, generally designated as 10, and a diagonally upwardly directed frame section extending from one end of frame section 10 and generally designated as 12.

Frame section 10 comprises two spaced parallel rows of spaced upright posts, including posts 14 and 16, at each end of frame section 10; each pair of posts 14 and 16 being interconnected at their upper ends by transverse bars 18 on which are supported spaced, longitudinally disposed, parallel, preferably channel-shaped bars 20. Frame section 12, likewise comprises longitudinally extending spaced, paralle, channel-shaped bars 22, each connected by one end to a bar 20, as at 24, and each supported by at least one upright post 26; the two posts 26 being likewise interconnected by a horizontal, transverse bar, 28. Transverse bars 18 support, between the longitudinally extending channel bars, 20 and 22, a channel member, generally designated as 30, which comprises a bottom wall 32 and side walls 34; each of the latter being inwardly and then downwardly offset to form downwardly facing channels, 36, at selected points on which, particularly at the inner end of frame section 10, are mounted rollers, 38, whose peripheries are spaced from the bottom wall 32 of member 30.

Frame sections 10 and 12, respectively support at their free ends drums or rollers 40 and 42 over which is mounted the endless conveyor belt, generally designated as 44, which passes within channel 30 and below rollers 38. Belt 44 is stretched to have its top and bottom portions extend in substantially parallel relation by means or rollers 46 mounted on arms 48 depending from channel bars 20, at their inner ends, around which the lower portion of the conveyor belt 44 passes. One of the drums as 42 may be the driven one; being operatively connected to a motor, 49, mounted on a plate, 50 dependently supported on one of the channel members 22 of frame section 12.

It may here be stated that, where desired, the apparatus may be entirely horizontal, in continuation of section 10, or arranged on a slope or diagonal, as in continuation of section 12. In either of these instances, rollers 38 and 46 may be eliminated, if desired.

Conveyor belt 44 comprises a flexible base, 52, and a relatively stiff spine, 54, extending uprightly from a midpoint of the width of said base 52, and extending its entire length. In order to render the spine 54 sufficiently yieldable to enable belt 44 to pass around drums 40 and 42, it is vertically slit at appropriately spaced intervals, the slits extending the full height of the spine. In the illustrated embodiment, the slitting is shown to comprise cut-out triangular darts, 56, forming tooth-like cleats, 58, of truncated triangular shape, extending the length of the conveyor belt 44.

Preferably, conveyor belt 44 is formed of a separate, flexible web, 60, and spine 54 is likewise separately formed preferably in sections, each of which is of a length to provide a plurality of cleats, 58, and is provided with a laterally offset flexible extension, 62, to each side thereof, by which the spine 54 is adhesively or otherwise secured to the web 60.

Where it is desired to provide article-pushing cleats on the conveyor belt 44, the sections of material providing cleats 58 may be interspersed by shorter sections of material having a spine, 64, greater height than cleats 58; each being of a length to provide a single cleat that is taller than cleat 58 and preferable having a forward edge, 66, that is normal to the conveyor belt base 52. Such shorter and taller spine sections are likewise provided with lateral, offset, flexible extension, 68, by which they are secure to web 60.

The apparatus of the invention is provided with an upwardly and outwardly sloping article guide plate, 70, to each side of the spine 54 of the belt; the lower edges of the guide plates 70 being disposed at a level above the upper ends of the lower cleats 58 and are laterally spaced therefrom; with the higher cleats 64 being of a height to extend above the said lower edges and into the space between the guide plates 70. Guide plates 70 are mounted on brackets 72 which are supported on the upper surface of channel bars 20, and 22, as by the bolts, 74, and nuts, 76. Preferably the brackets 72 may be adjustable in position in a direction normal to the channel bars, to thereby make possible to vary the space between the lower edges of guide plates 70, to accomodate the apparatus for feeding articles of varying thickness. To this end, base, 78, of brackets 72 may be formed with elongated openings, 80, for the bolts 74 that will permit the movement of the brackets toward and away from one another on their supporting channel bars 18 and 22.

In operation, the apparatus is disposed with its receiving end below the outlet of a molding apparatus. The molded articles such as the bottles 82 will drop into the apparatus between the guide plates 70 and will make a two or three point contact with the apparatus; namely, with the top of the cleats 58 and with the lower edge of one or both of guide plates 70, to thereby have minimal frictional contact with the apparatus and expose maximum surface area for cooling. The scrap or tails 84 of the bottles 82, or the like, will drop into the space between the lower edges of the guide plates 70 to one or the other side of the cleats cleats 58. The bottles 82 may be conveyed by the belt to an upper chute, 86, which may direct them to a bin or to a conveyor belt. The scrap 84, which rests on the base of the conveyor belts, at a lower level than the bottle 82 will be conveyed to a second, lower chute, 88, which may convey it directly to a grinder to be prepared for re-use or into a collecting bin 90.

If desired, especially where all or part of the apparatus is disposed at an upwardly slopkng angle to the horizontal, in the manner of section 12 of the illustrated apparatus, longitudinally spaced cleats 92 may be secured on the surface of the base of the belt 44, to each side of cleats 58, to serve as pushers for positively moving the scrap to the outlet end of the apparatus.

This completes the description of the apparatus of the present invention. It will be readily apparent that such apparatus is highly suitable for its intended use; that its conveyor belt is more durable and provides more positive movement of the articles resting thereon. It will also be apparent that the apparatus of the present invention may be readily and easily converted for use with articles of different thicknesses.

It will be further apparent that numerous variations and modifications may be made in the apparatus of the present invention by anyone skilled in the art in accordance with the principles of the invention hereinabove set forth, and without the exercise of any inventive ingenuity.

What we claim is:

1. A separator-conveyor for products discharged from blow molding apparatus, said products including the molded article and the scrap comprising the portions of the parison tube engaged between the walls of the mold sections of the blow molding apparatus, said apparatus including a frame, an endless conveyor belt and means on said frame for supporting said conveyor belt for continuous movement, said belt including an endless flexible base and a plurality of closely spaced, substantially flat sided, erect cleats arranged in a longitudinally extending row on said web at a midpoint of the width thereof and extending the entire length thereof, and outwardly and upwardly tapering guide plates mounted on said frame, one to each side of said row of cleats, said guide plates having their lower edges disposed at a level above the top of said cleats and laterally spaced therefrom, whereby an article discharged from the blow molding apparatus will be supported on the tops of said cleats and on the adjacent edge of at least one of said guide plates, and said scrap will drop between the conveyor edges of said guide plates and said row of cleats onto said base.

2. The separator-conveyor of claim 1, wherein selected of said cleats are of greater altitude than the other of said cleats and project into the space between said guide plates and are adapted to engage articles resting on said other cleats for pushing said articles for movement with said conveyor belt.

3. The separator-conveyor of claim 1, wherein said guide plates are adjustably supported for movement laterally toward and away from said row of cleats.

4. The separator-conveyor of claim 1 wherein said conveyor belt comprises a flexible web and a body including a relatively rigid spine and a laterally offset flexible extension at each side of said spine, said body secured by said extension to said web, said spine having spaced slits formed therein extending the full height of said spine.

5. The separator-conveyor of claim 4 wherein said slits comprise triangular darts cut into said spine.

6. The separator-conveyor of claim 1, wherein said endless conveyor belt comprises an endless flexible web and a superposed body comprising a relatively rigid, upright spine having laterally extending flexible base portions to each side thereof, said body secured to said web by said base portions with said spine extending longitudinally thereof; said spine having relatively closely spaced slits formed therein extending from its outer edge to its base to thereby render said belt flexible.

7. The separator-conveyor of claim 6, wherein said slits comprise triangular shaped cut-out darts formed in said spine.

8. The separator-conveyor of claim 7, wherein said body includes relatively longer body sections having spines of uniform relatively low altitude and of a length to provide a plurality of said cleats, said sections interspersed by body sections having spines of relatively greater altitude and of a length to provide a single cleat of a height to extend into the space between said guide plates above their lower edges.

9. An endless conveyor belt for a separator-conveyor of the character described, comprising an endless flexible web and a superposed body on said web, said body comprising a relatively rigid spine and laterally offset flexible base portion to each side of said spine, said body secured to said endless flexible web by said flexible base portions with said spine extending longitudinally of said web; said spine having relatively closely spaced slits formed therein extending from its outer edge inwardly thereinto to said base, to form a plurality of tooth-like cleats, and thereby render said endless belt flexible around a supporting drum.

10. The endless conveyor belt of claim 9, wherein said slits comprise triangular darts cut into said spine.

11. The endless conveyor claim 10, wherein said superposed body comprises sections having a spine of relatively lower altitude and of a length to provide a plurality of said cleats therein interspersed by sections having a spine of relatively greater altitude and of a length to provide a single of said cleats.

* * * * *